(No Model.)

R. N. WATTS.
CONCAVE FOR THRASHING MACHINES.

No. 489,724. Patented Jan. 10, 1893.

Attest:
Walter Donaldson
William Hall

Inventor
Robert N. Watts
by Ellis Spear
Atty.

United States Patent Office.

ROBERT NELSON WATTS, OF UINTAH, UTAH TERRITORY.

CONCAVE FOR THRASHING-MACHINES.

SPECIFICATION forming part of Letters Patent No. 489,724, dated January 10, 1893.

Application filed December 18, 1891. Serial No. 415,524. (No model.)

*To all whom it may concern:*

Be it known that I, ROBERT NELSON WATTS, a citizen of the United States of America, residing at Uintah, in the county of Weber and Territory of Utah, have invented certain new and useful Improvements in Concaves for Thrashing-Machines, of which the following is a specification.

My invention is a concave for thrashing machines with removable section and adjustable teeth and is an improvement on Letters Patent No. 433,044 granted to Charles Schmalz and myself on the 29th of July, 1890.

The invention includes a simple construction and arrangement of movable sections, a grating for preventing what is known as the back lash; and improved means for adjusting the teeth.

Figure 1:
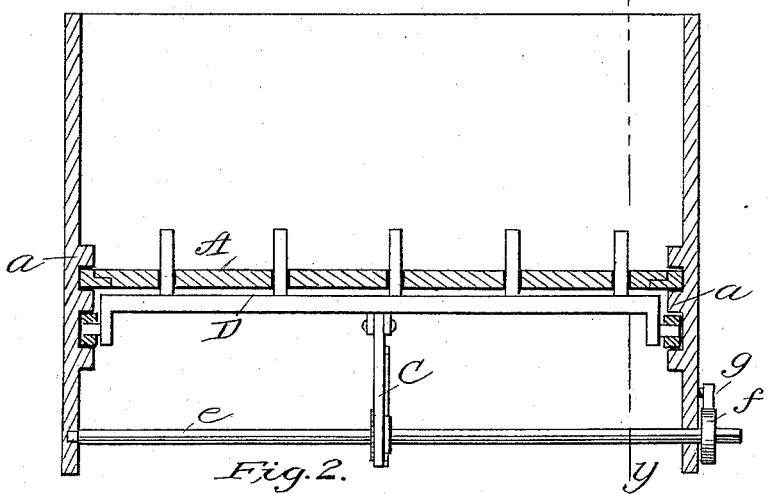
Figure 2:
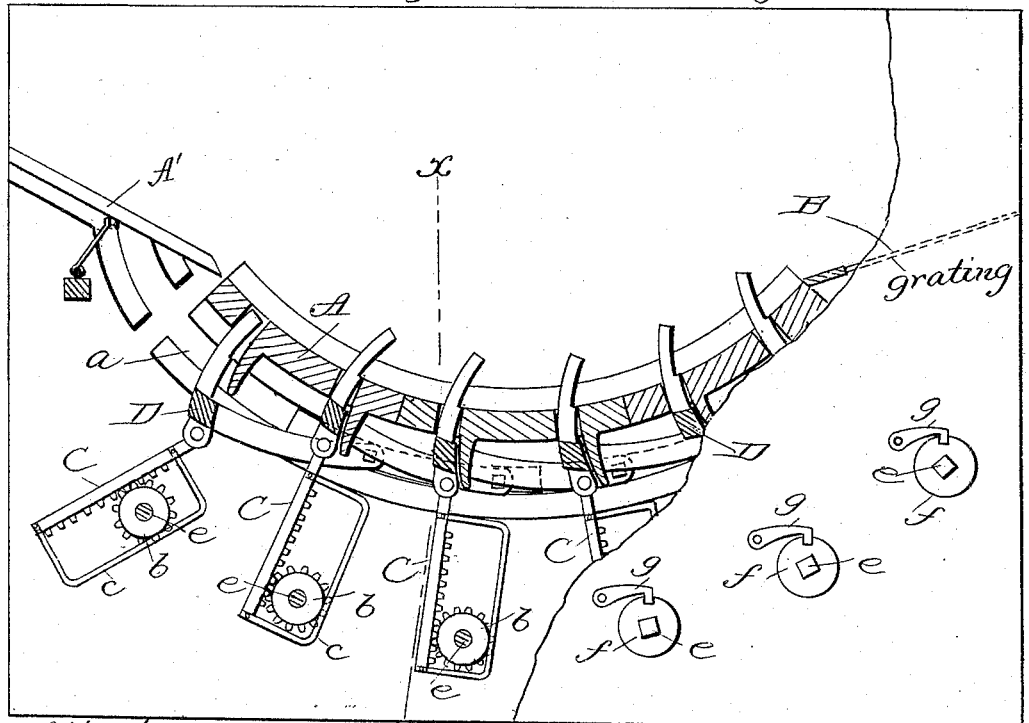

In the accompanying drawings Figure 1 is a section through the side walls of the concave showing one of the bars D, the operating shaft, and the connections between said shaft and bar, this figure being a section on line $x$—$x$ of Fig. 2. Fig. 2 is a side elevation of the concave with one of the walls removed.

The frame work of the concave is of ordinary construction and the bottom thereof A, is made up of removable sections, preferably three in number fitting each other closely and held in grooved ways $a$, as in the patent referred to. At the end opposite the wedge board A', I arrange a grating B which abuts against the section adjacent thereto at the rear of the concave and prevents any movement thereof.

Each of the three sections of the bottom of the concave is provided with a double set of openings adapted to permit the passage of the teeth which extend through from the lower side, but while I have shown two rows for each section it will be understood that I do not limit myself in this connection. These teeth are adjustable and the teeth of each row are capable of adjustment independent of the teeth of the other rows, and I will now describe the operation to effect the adjustment of these teeth. The teeth of each set are carried upon a bar D which is similar to the bar in the patent referred to being provided with short arms at each end pivoted to a slide fitted to a groove. This bar is supported at or near its center upon the upper end of a rack bar C to which it is connected by a hinged joint. The rack bar is operated through a cog wheel $b$, which gears with the rack being held thereto by a strap or bow of metal $c$, passing around and bearing upon an offset $d$ of the cog wheel, so that the cog wheel and rack are always kept in engagement. The cog wheels are secured to a shaft $e$, one end of which extends through the wall of the concave and is provided with a notched disk $f$ carried upon the squared end thereof and a stop lever $g$, pivoted on the side wall of the concave is adapted to engage with the notch or notches and thus hold the teeth after they have been properly adjusted. The shaft is turned by means of a wrench applied to the squared end of the shaft projecting from the wall of the concave.

It will be understood that each bar D of the series is provided with similar operating means.

I have found that in this construction I save in the power necessary to operate the apparatus and also lessen the work of the person feeding the machine.

I claim as my invention:

1. In combination with the sectional bottom of a concave provided with a series of openings, a series of bars D, carrying teeth fitting said openings, a rack bar pivoted to each bar D, a cog wheel engaging the rack, a strap secured to the rack bar with its central portion parallel thereto for keeping the rack bar and cog wheel in engagement, substantially as described.

2. In combination with the sectional concave bottom provided with rows of openings, a series of bars D, carrying teeth fitting said openings, a rack bar pivoted to each bar D, a cog wheel engaging said rack bar, an offset formed upon the side of the cog wheel, and a strap or bow having its ends secured to the rack bar and its central portion parallel therewith and bearing on the offset for keeping the cog wheel and rack in engagement, substantially as described.

In testimony whereof I affix my signature in presence of two witnesses.

ROBERT NELSON WATTS.

Witnesses:
CHARLES SCHMALZ,
N. TANNER, Jr.